United States Patent

[11] 3,616,998

| [72] | Inventor | Frank H. Schneider |
| | | Richmond, Va. |
| [21] | Appl. No. | 864,404 |
| [22] | Filed | Oct. 7, 1969 |
| [45] | Patented | Nov. 2, 1971 |
| [73] | Assignee | Robertshaw Controls Company |
| | | Richmond, Va. |

[54] THERMOSTATIC CONTROL DEVICE
13 Claims, 4 Drawing Figs.

[52] U.S. Cl. .................................................. 236/99,
137/468, 137/508
[51] Int. Cl. ...................................................... G05d 23/12
[50] Field of Search ........................................... 236/15 A,
99; 431/75; 137/468, 508

[56] References Cited
UNITED STATES PATENTS

| 3,065,913 | 12/1962 | Holzboog et al. ............ | 236/99 X |
| 3,423,021 | 1/1969 | Bergquist ..................... | 236/15 A |
| 3,398,890 | 8/1968 | Fleer ............................ | 236/15 A |

Primary Examiner—Meyer Perlin
Assistant Examiner—Ronald C. Caposseli
Attorneys—Auzville Jackson, jr., Robert L. Marben and Anthony A. O'Brien ABSTRACT: A thermostatic control device controlling the flow of fuel to a gas burner and including a pair of movable valve elements with temperature-setting means positioning one of the valve elements at a position corresponding to a desired temperature setting, and thermal-responsive means operatively connected to move the other valve element in response to temperature variations from the desired temperature setting.

PATENTED NOV 2 1971

3,616,998

INVENTOR,
Frank H. Schneider

BY *Anthony A. O'Brien*

ATTORNEY

3,616,998

THERMOSTATIC CONTROL DEVICE

BACKGROUND OF THE INVENTION

1. Field of the Invention

The present invention relates to a thermostatic control device and, more particularly, to such a device for regulating the flow of fuel through the hood element of a gas burner mixer.

2. Description of the Prior Art

Thermostatic control devices for regulating a gas flow in accordance with variations from a preset temperature setting are well known in the prior art as exemplified by U.S. Pat. Nos. 3,123,296 and 3,337,179; in addition, thermostatic control devices for controlling the flow issuing through the hood of a burner mixer are exemplified by U.S. Pat. Nos. 3,084,865 and 2,884,009.

In all of the known prior art devices, the valve means for controlling the outlet flow includes one valve element which is moved relative to the other valve element by various types of mechanisms responding to temperature variations. Precise temperature setting and control in such prior art devices have been impeded by the use of complicated temperature-setting mechanisms which acted on the same valve element that was connected to the temperature-responsive means or which, when acting on a different valve element than that which acted on by the temperature-responsive means, further required a complex valve mechanism inside the valve housing whereby assembly and calibration were difficult problems to overcome. The use of such internal valve mechanisms resulted in large pressure drops across the valve making it necessary to use larger valve elements and higher gas pressure whereby leakage, assembly and calibrations problems were enhanced further.

SUMMARY OF THE INVENTION

It is, therefore, an object of the present invention to construct a thermostatic control device for relatively few components operating in a simple and efficient manner.

The present invention has the particular advantage of overcoming the disadvantages of conventional thermostatic control devices by reducing the need for a higher gas pressure.

Another object of this invention is to utilize the outlet port of a thermostatic control device as a movable valve seat that is actuated in accordance with temperature variations.

The present invention has a further object in that the hood of a burner mixer is cycled thermostatically to regulate the fluid flow from a thermostatic control device.

In practicing the present invention, a thermostatic control device is provided with a housing having an inlet for receiving a fluid flow, a valve member movable between a plurality of control positions to control fluid flow, a temperature-setting mechanism operatively connected to the valve member for moving it to a control position corresponding to a desired temperature setting, thermal-responsive means adapted for movement in accordance to temperature variations, and outlet means for the housing operatively connected to the thermal responsive means for movement thereby in accordance with temperature variations and including valve seat means cooperating with the valve member to regulate the fluid flow out of the housing.

Other objects and advantages of the present invention will become apparent from the following description taken in conjunction with the accompanying drawing.

DESCRIPTION OF THE PREFERRED EMBODIMENTS

Figure 1:
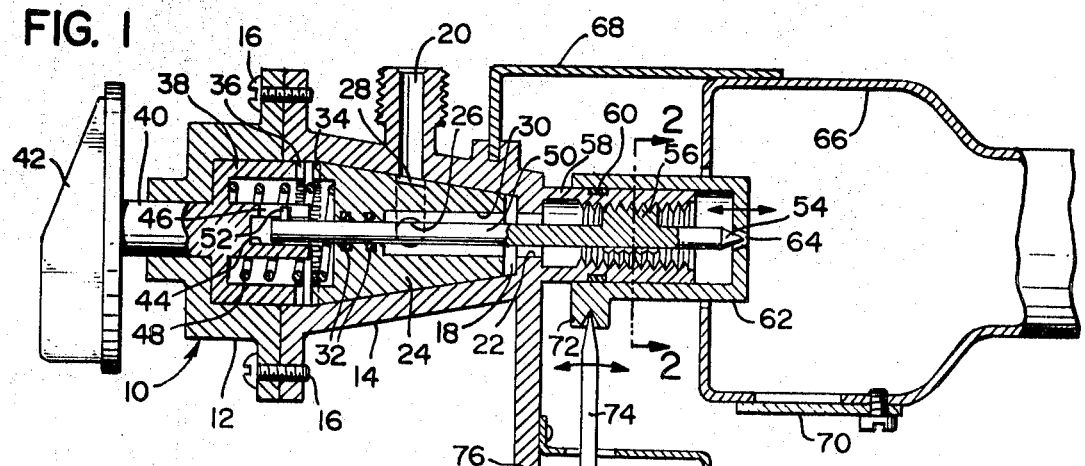
FIG. 1 is a partial side elevation view, partly in section, of a thermostatic control device embodying the present invention.

As is illustrated in FIG. 1, the thermostatic control device embodying the present invention includes a valve housing, indicated generally at 10, having a front casing 12 and a rear casing 14 secured together by any suitable means such as bolts 16 threaded through flanged portions of the tube casings. The interior of the housing 10 is hollowed out to form a valve seat or chamber 18 which establishes communication between an inlet port 20 and a flow port 22. The valve chamber 18 is in the form of a frustoconical bore forming a tapered valve seat which intersects the inlet port 20; a tapered plug cock or hollow valve member 24 has a correspondingly tapered surface for cooperation with the tapered valve seat 18.

One or more flow ports 26 are transversely disposed through the wall of the hollow valve member 24 and are connected by an arcuate peripheral groove 28 to permit a flow of gas from the inlet 20 to an internal bore 30 of the plug valve 24. Adjacent its larger end, the tapered plug valve 24 has a central bore extending from the bore 30 through the end wall of the plug valve; a plurality of spaced O-ring seals 32 are fitted into cutouts of the wall defining the through bore. The enlarged end of the tapered plug valve 24 has a central recess communicating with the through bore, the peripheral wall of which defines an annulus having gear teeth 34 similar to a ring gear.

As is illustrated in FIG. 1, a similar set of gear teeth 36 are disposed in mating relationship with the teeth 34 and are disposed in arcuate or annular fashion on the peripheral lip of a cup-shaped drive member 38. The drive cup 38 is integrally formed on a centrally disposed drive shaft 40, one end of which slidably and rotatably extends through an opening in the casing 12 to receive an operating knob, such as a temperature setting dial 42. The inner end of the drive shaft 40 is coaxial with the drive cup 38 and has a central bore 44 with a longitudinally extending slot 46. A coil spring 48 surrounds the inner end of the drive shaft 40 so that its major portion is housed within the drive cup 38; the coil spring 48 is mounted in compression between the recessed wall of the tapered plug valve 24 and the bottom wall of the drive cup 38 whereby the tapered plug valve 24 is normally biased in its tapered seat 28 and the drive cup 38 and operating shaft 40 are normally biased towards the bottom wall of the casing 12.

An operating element in the form of a rod 50 is slidably and rotatably disposed in the through bore of the tapered plug valve 24 so as to engage the O-ring seals 32 therein and has one end disposed in the bore of the drive shaft 40. A key in the form of a pin 52 radially projects from such end of the rod 50 and is disposed in the keyway slot 46 to form a drive connection between the drive shaft 40 and the operating rod 50.

Figure 2:
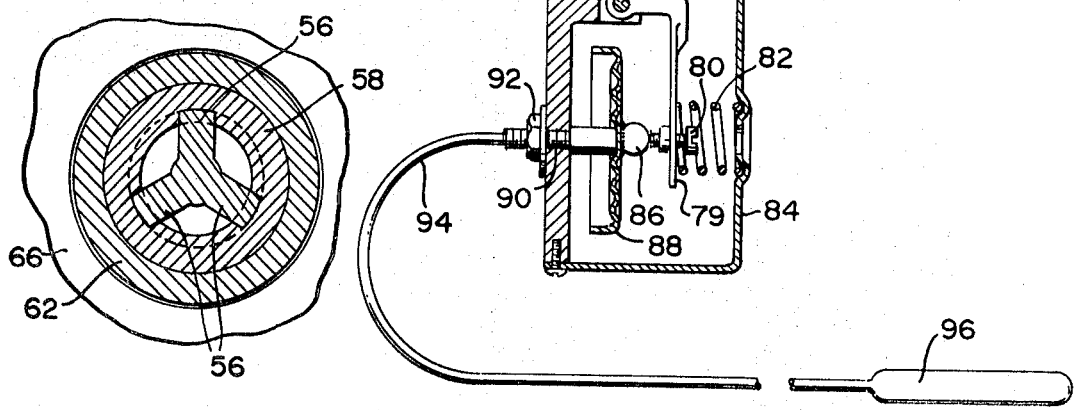
FIG. 2 is a cross section taken on line 2—2 of FIG. 1.

The operating rod 50 axially extends through the internal bore 30, through the flow port 22 and terminates in a conical end portion defining a nozzle type valve element 54. Slightly spaced from the valve element 54 the operating rod 50 is provided with a plurality (three in FIG. 2) of radial projections 56 which are equally spaced from each other about the circumference of the operating rod 50. The outer peripheral wall of the radial projections 56 are threaded for cooperation with the internal threads of a hollow cylindrical extension 58 which is an integral part of or which may be merely fastened to, the end wall of casing 14 so that its internal bore is in alignment with flow port 22. The outer wall of the cylindrical extension 58 has an annular cutout of rectangular cross section which receives a similarly shaped seal 60 made of any suitable material having sealing and nonsticking characteristics, such as Teflon.

A generally cup-shaped hood or movable casing 62 is slidably mounted on the periphery of the cylindrical element 58 and is provided with a tapered bore in its bottom wall to define outlet port 64 that cooperates with the valve element 54. The hood element 62 projects through an enlarged opening in a hollowed burner mixer 66 which provides a means for transmitting the flow of gaseous mixture to a gas burner (not shown). The mounting end of the burner mixer 66 is attached to the valve casing 14 by any suitable means such as a bracket 68 while the burner end of the mixer 66 is supported in the usual manner found in gas burning devices such as a cooking stove. One wall of the burner mixer 66 has an opening for the flow of primary air, which opening is controlled by an adjustably mounted shutter 70 as is well known in the art.

Adjacent its inner end the slidable hood 62 has a radial projection defining a fulcrum 72 which is engaged by the edge of a lever 74 to impart sliding movement to the hood 62. The lever 74 is pivotally attached intermediate its ends to a supporting wall 76 that may be integrally formed with the valve casing 14 or which may be fixed in relative position thereto as by securing it to a wall of the cooking stove. A pivot pin 78 serves for the intermediate mounting of the lever 74; the lower end of the lever 74 as viewed in FIG. 1 generally comprises a bellcrank arrangement with the free end 79 carrying an adjustable set screw 80. A coil spring 82 surrounds the head of the adjustable screw 80 and is mounted in compression between the lever end 79 and a housing 84 which is secured to the mounting plate 76 by any suitable means such as rivets or bolts. The adjusting screw 80 extends through a threaded boss on the lever end 78 into engagement with a ball element 86 exteriorly mounted on a diaphragm-type power element 88. The power element 88 may be of any suitable type known in the art that will expand and contract in response to sensed temperature variations; such a power element 88 conventionally includes a pair of spaced diaphragms joined at their periphery in cup-shaped fashion. A hollow stud 90 has one end fixed to the power element 88 and its other end abutting the mounting plate 76; an extension on the other end of the stud 90 is threaded whereby the assembly is fixed to the mounting plate 76 by means of a locknut 92. Such end of stud 90 receives the end of a capillary tube 94, which in turn is connected to a temperature-sensing bulb 96 suitably spaced in an area to be temperature controlled.

The power element 88, the stud 90, the capillary tube 94 and the sensing bulb 96 constitute a closed system filled with a thermally expansible fluid such that a variation of temperature produces a corresponding expansion or contraction of the power element 88. The ball element 86 which is fixed to the exterior of the power element 88 effects a corresponding movement of the lever 74 about the pivot 78 to produce reciprocation of the hood element 62.

In order to place the thermostatic control device in operation, the temperature-setting dial 42 is depressed inwardly so that the drive cup teeth 36 engage the teeth 34 on the plug valve 24 with the central bore 44 and slot 46 of the drive shaft 40 merely sliding axially relative to the valve stem 50 and key 52. While in its depressed position the dial 42 is rotated a predetermined angular distance (e.g. 90°) so that the plug valve port 26 (or the arcuate groove 28) is brought into registry with the inlet port 20. The dial 42 is now released from its depressed position to disengage the teeth 34 and 36 whereby subsequent rotation of the drive shaft 40 only effects a corresponding rotation of the operating rod or valve stem 50 to a selected temperature setting. The rotation of the valve stem 50 causes axial movement thereof by reason of the threaded projections 56 in the bushing 58. Such axial movement of the valve stem 50 displaces the conical valve end 54 away from the conical valve seat 64.

It should be noted that any other form of drive mechanism may be utilized to effect opening of the plug valve 24 and setting of the valve 54 to correspond to a desired temperature setting. Furthermore, it is not necessary to separate drive cup 38 from the plug valve 24 but a simple direct drive may be utilized by making the arcuate length of groove 28 sufficiently large to assure communication between inlet 20 and flow port 26 for all temperature settings of the dial 42. Regardless of what kind of drive is utilized, it is only necessary that the valve end 54 be adjustable to dial settings with the orifice relation to the valve seat 64, the position of which is controlled by the temperature of the thermal sensing device.

FIG. 1 represents the relative positions for the various components of the thermostatic control device when it is set to a particular temperature setting as described above. Accordingly, the flow of gas issues from the valve seat 64 with a jet action into the burner mixer 66 and thence to the burner where it is ignited by any suitable means. When the temperature of the space being heated reaches that for which the dial 42 has been set, the power element 88 will expand causing the lever 74 to pivot counterclockwise about the pivot 78 (as viewed in FIG. 1) whereby the hood 62 is moved to the left and the valve seat 64 moves into engagement with the valve end 54 to cut off the flow of fuel to the burner. With a decrease in the temperature of the space being heated as sensed by the remote temperature sensing bulb 96, the lever 74 will pivot clockwise about its pivot 78 causing outward movement of the hood 62 and an opening of the valve seat 64 to establish the flow of fuel to the burner where it is ignited. The above arrangement will permit thermostatic cycling in order to maintain the space being heated at the desired temperature setting.

When it is desired to turn off the thermostatic control device, the dial 42 is depressed and rotated to its off position causing a movement of the valve element 54 to the right as viewed in FIG. 1 and causing the plug valve 24 to be moved to its off position where the peripheral groove 28 is moved out of registry with the inlet port 20. Suitable stops (not shown) are conventionally located between the housing and plug valve 24 to define its angular limits of rotation in both directions. In the event there is an overshoot of the temperature during the thermostatic cycling, the lever end 79 is made of tempered stainless steel in order to flex when the valve seat 64 is closed on the valve element 54; thus, any force caused by the overshoot condition is not imparted to the valve mechanism.

Figure 3:
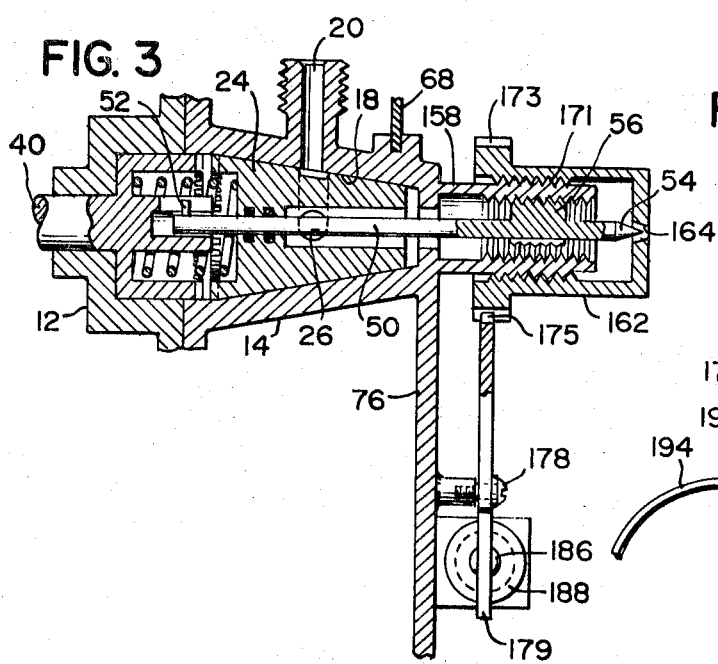
FIG. 3 is a partial side elevation view similar to FIG. 1 but showing a modification thereof.
Figure 4:
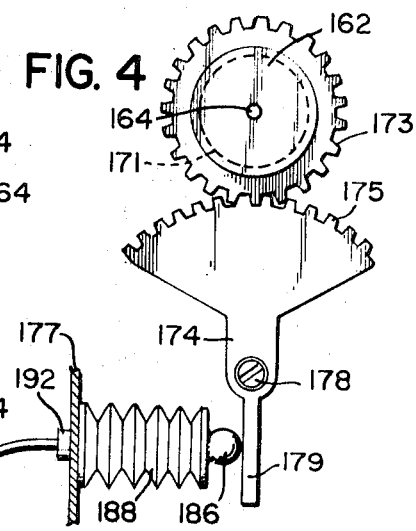
FIG. 4 is an end view of FIG. 3 as seen from the right side thereof.

A modification of the above device is illustrated in the FIGS. 3 and 4 wherein identical reference numerals are utilized for identical parts described in FIG. 1, reference numerals with 100 added are utilized to describe parts corresponding to similar parts of FIG. 1, and new reference numerals are utilized to describe new parts. Accordingly, for the sake of brevity, only the structure that is different from FIG. 1 and only the function and operation that are likewise different, are being described hereinafter.

As is illustrated in FIG. 3, the outlet means or hood 162 has a conical valve seat 164 in its bottom wall and the interior surface of its cylindrical wall is provided with threads 171 mating with similar threads formed on the exterior wall of the bushing 158; axial movement of the bushing 162 is thus effected by relative rotation of its threads 171. Adjacent its peripheral lip, the outlet hood 162 is provided with a plurality of gear teeth 173 similar to a pinion. The gear teeth 173 mesh with the teeth of rack 175 arcuately formed on an adjacent sector of a lever 174 which is pivoted intermediate to ends to a pivot post 178. The free end 179 of lever 174 is engaged by a ball element 186 secured to one end of an expanding and contracting bellows 88 which has its other end secured to a supporting ledge 177 on bracket 76 by means of hollow stud 192. The other end of the stud 192 receives the end of capillary tube 194 in the same manner as described with the capillary tube 94.

Contraction and expansion of the power element 188 in FIG. 4 causes a corresponding clockwise and counterclockwise movement of the lever 174 whereby the rack 175 causes the hood 162 to move axially on its threads 171. The remaining sequence of operation of the modification in FIGS. 3 and 4 is substantially the same as that above with respect to FIG. 1.

The above arrangements have the particular advantage that the thermostatic control of the gas flow takes place at the orifice 64 (and 164) so that the pressure drop through the control device is not affected by internal valve mechanisms. Thus, the conventional regulatory type valve mechanisms normally found in the interior of a thermostatic control device are not present in this invention. In addition, assembly and calibration have been simplified by elimination of such internal valving mechanisms.

The actuating lever mechanisms of FIGS. 1-2 and FIGS. 3-4 have been illustrated as a gradual acting leverage system; however, other types of systems may be used, such as a common snap action type, to conform to the requirements of a particular environment.

The invention described above in connection with FIGS. 1 through 4 present a wide deviation from conventional thermostatic devices in that once the dial 42 is rotated to a desired temperature setting, the only control of the fluid flow occurs at the outlet 64 (and 164). Accordingly, there is no need for a pressuretight housing whereby leakage problems are virtually eliminated. By moving the outlet hood 62 (and 162) in response to thermostatic cycling, the thermally responsive mechanism is exterior of the valve housing and not subject to gas pressure or to the chemical environments.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. In a thermostatic control device for controlling a fluid flow of fuel to a burner, the combination comprising
   a valve housing having inlet means adapted to receive a fluid flow from a fuel source,
   a pair of movable valve elements cooperating with each other to control the fluid flow,
   one of said valve elements being movably positioned inside said housing,
   temperature-setting means operatively connected to said one valve element for moving the same to a controlling position corresponding to a desired temperature setting,
   the other of said valve elements being movably positioned outside said housing and including valve seat means cooperating with said one valve element,
   thermal-responsive means operatively connected to said other valve element for moving the same relative to said one valve element in response to temperature variations from the desired temperature setting, and
   said other valve element defining outlet means for said housing whereby leakage problems through said housing is so minimized that need for a pressuretight housing is eliminated.

2. The invention as recited in claim 1 wherein said thermal-responsive means is operatively disposed outside of said housing so as to be unaffected by fluid flow pressure and by chemical contamination of the fluid flow.

3. In a thermostatic control device for controlling a fluid flow of fuel to a burner, the combination comprising
   a housing having inlet means for receiving a fluid flow,
   a valve member movable between a plurality of control positions to control the fluid flow,
   temperature-setting means operatively connected to said valve member for moving the same to a control position corresponding to a desired temperature setting,
   thermal-responsive means adapted for movement in accordance to temperature variations from the desired temperature setting, and
   outlet means for said housing operatively connected to said thermal-responsive means for movement thereby in accordance with temperature variations and including valve seat means cooperating with said valve member to regulate the fluid flow out of said housing,
   said valve seat means being disposed exteriorly of said housing to minimize leakage problems through said housing.

4. The invention as recited in claim 3 wherein said valve seat means includes a conical valve seat and said valve member includes a conical valve end cooperating with said conical valve seat to issue the fluid flow with a jet action.

5. In a thermostatic control device for controlling a fluid flow of fuel to a burner, the combination comprising
   a housing having inlet means for receiving a fluid flow,
   a valve member movable between a plurality of control positions to control the fluid flow,
   temperature-setting means operatively connected to said valve member for moving the same to a control position corresponding to a desired temperature setting,
   thermal-responsive means adapted for movement in accordance to temperature variations from the desired temperature setting, and
   outlet means for said housing operatively connected to said thermal responsive means for movement thereby in accordance with temperature variations and including valve seat means cooperating with said valve member to regulate the fluid flow out of said housing,
   said outlet means including a generally cup-shaped hood element having a peripheral wall movably disposed on said housing and a bottom wall defining said valve seat means.

6. The invention as recited in claim 5 wherein the peripheral wall of said hood element is slidably mounted on an exterior of said housing for for axial movement thereon.

7. The invention as recited in claim 5 wherein the peripheral wall of said hood element is rotatably threaded on said housing for axial movement thereon.

8. The invention as recited in claim 5 wherein said valve seat means includes a conical valve seat and said valve member includes a conical end portion disposed adjacent said valve seat whereby the fluid flow is delivered with a jet action.

9. In a thermostatic control device, a combination comprising
   a housing having an inlet port communicating with a valve chamber,
   on-off valve means in said valve chamber controlling a fluid flow from said inlet port to said valve chamber,
   a hollow bushing on said housing communicating with said valve chamber and permitting a fluid flow therefrom,
   a valve member having a valve stem extending through said bushing and said valve chamber,
   means supporting said valve stem in said bushing and permitting axial movement therein,
   manual operating means carried by said housing and being operatively connected to said on-off valve means for moving the same between on-off positions and to said valve stem for moving the same in said bushing to actuate said valve member to a selected position,
   thermal-responsive means adapted for movement in accordance to temperature variations,
   outlet means for said housing movably disposed relative to said bushing and having a valve seat disposed exteriorly of said housing to minimize leakage problems through said housing and cooperating with said valve member to regulate the fluid flow out of said housing, and
   means defining an operative connection between said thermal responsive means and said outlet means to impart a regulatory movement to said outlet means whereby the fluid flow therethrough is varied in accordance with temperature variations.

10. In a thermostatic control device, a combination comprising
    a housing having an inlet port communicating with a valve chamber,
    on-off valve means in said valve chamber controlling a fluid flow from said inlet port to said valve chamber,
    a hollow bushing on said housing communicating with said valve chamber and permitting a fluid flow therefrom,
    a valve member having a valve stem extending through said bushing and said valve chamber,
    means supporting said valve stem in said bushing and permitting axial movement therein,
    manual operating means carried by said housing and being operatively connected to said on-off valve means for moving the same between on-off positions and to said valve stem for moving the same said bushing to actuate said valve member to a selected position,
    thermal-responsive means adapted for movement in accordance to temperature variations, outlet means for said housing movably disposed relative to said bushing and having a valve seat cooperating with said valve member to regulate the fluid flow out of said housing, and means defining an operative connection between said thermal responsive means and said outlet means to impart a regulatory movement to said outlet means whereby the fluid flow therethrough is varied in accordance with temperature variations, said outlet means including a generally cup-shaped hood having a cylindrical wall movably carried by said bushing and a bottom wall defining said valve seat.

11. The invention as recited in claim 10 wherein said valve seat includes a conical valve seat and said valve member includes a conical end portion adapted to extend into said conical valve seat and deliver the fluid flow with a jet action.

12. The invention as recited in claim 10 wherein the cylindric wall of said hood is slidably movable on the exterior of said bushing and wherein said operative connection comprises a fulcrum and lever assembly between said cylindrical wall and said thermal responsive means.

13. The invention as recited in claim 10 wherein the cylindrical wall of said hood is threaded onto the exterior of said bushing for longitudinal movement thereon and wherein said operative connection comprises a rack and pinion assembly between said cylindrical wall and said thermal responsive means.

* * * * *